Nov. 19, 1935.  L. L. CARSON  2,021,351
VALVE
Filed June 16, 1931
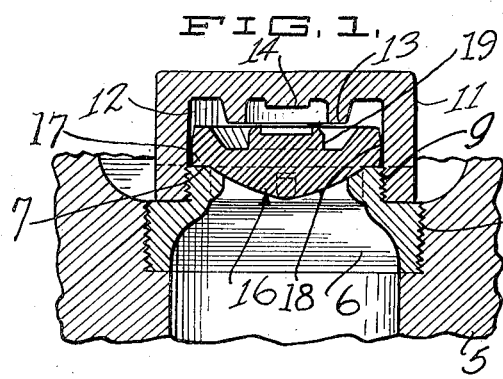
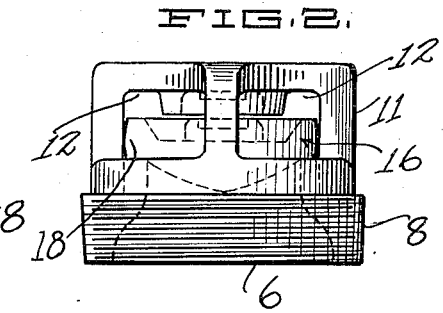
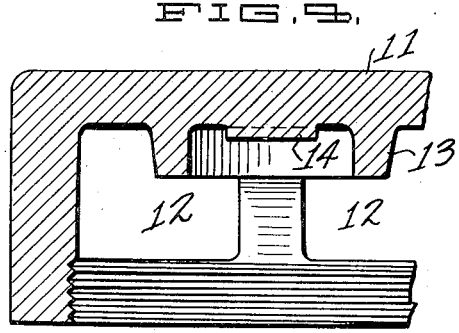
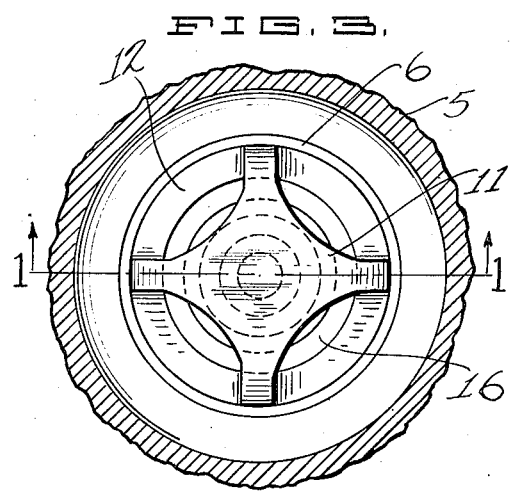
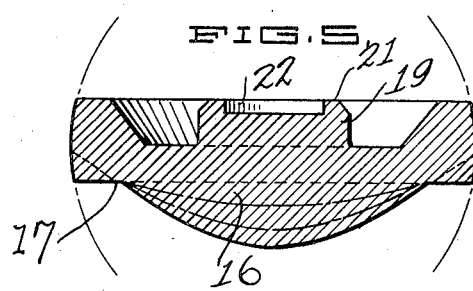
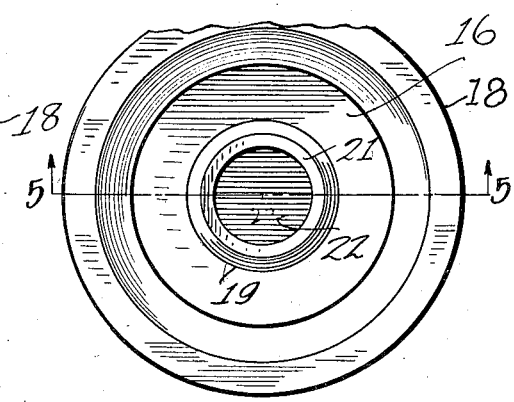
INVENTOR.
LEE L. CARSON.
BY *Victor J. Evans & Co*
ATTORNEYS.

Patented Nov. 19, 1935

2,021,351

UNITED STATES PATENT OFFICE 2,021,351

VALVE

Lee L. Carson, Whittier, Calif., assignor, by direct and mesne assignments, of one-half to George T. Dunn and one-half to Lillie M. Carson, both of San Diego, Calif.

Application June 16, 1931, Serial No. 544,887

3 Claims. (Cl. 251—128)

This invention relates to improvements in valves and has particular reference to a valve which may be employed for the pumping of oil, one which will permit a maximum flow and one which cannot stick, and one wherein the valve action will be cushioned—thus removing a large amount of wear and tear upon the cage of the valve.

The principal object of this invention is to produce a device which is simple in construction and therefore economical to manufacture.

A still further object is to produce a valve which may have a variety of shapes to fit the particular purpose to which it is adapted.

A further object is to produce a valve which may be employed wherever a standard valve is now used.

Other objects and advantages will be apparent during the course of the following description.

In the accompanying drawing forming a part of this specification and in which like numerals are employed to designate like parts throughout the same, Figure 1 is a cross-section of a valve constructed in accordance with my invention, Figure 2 is a side elevation of the valve seat and cage removed from its support, Figure 3 is a top plan view of Fig. 1, Figure 4 is a large fragmentary detail view of a portion of the cage, Figure 5 is a cross-sectional view taken on the line 5—5 of Fig. 6, and Figure 6 is a top plan view of Fig. 5.

Valves are employed in many places for the purpose of controlling the flow of a fluid from one side of the valve to the other. Where the valve assembly is mounted in a pulsating or intermittent flow, the valve is apt to cause considerable noise, as well as damage to itself, its cage or whatever the retaining means may be.

Applicant has therefore devised a valve assembly wherein the cage and the valve are so formed that a natural cushion effect takes place as the valve opens.

In the accompanying drawing wherein for the purpose of illustration is shown a preferred embodiment of my invention, the numeral 5 designates any support for the valve seat ring 6 having a valve seat 7. This ring is threaded as at 8 to its support 5 and also has a threaded extension 9 upon which a cage 11 is threadedly secured. This cage 11 is preferably of the open type that is provided with passages 12 thru which the liquid passing thru the valve may escape. Centrally positioned in the cage is an annular ring 13 within which is positioned a projection 14. At 16 I have shown a valve body having a valve surface 17 which is adapted to engage the valve seat 7. By referring to Fig. 5, I have indicated in dotted lines, several shapes the surface of the valve might take. In this figure I have also shown that the periphery 18 of the valve has an arcuate cross-section, which prevents any possibility of the valve sticking during its opening and closing movement. Carried upon the upper surface of the valve is a boss 19 which terminates in an annular ring 21 within which is formed a recess 22. The boss 19 is adapted to fit within the annular ring 13 so that the projection 14 will enter the recess 22. It will be obvious, that if the recess 22 is filled with oil or other liquid which also fills the space within the annular ring 13, that as the valve moves upwardly, this oil will be forced out from between the ring 13 and the boss 19 with a resultant cushioning or retarding action of the opening of the valve. When the valve finally comes to rest, the projection 14 will come within the recess 22 and act as the final stop—and it will thus be seen that thru this construction, the hammering of the valve will be prevented and at the same time, the valve will be capable of handling any type of fluid there-thru.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a valve seat ring, a valve positioned thereon, a cage removably secured to said ring and surrounding said valve, an annular ring carried by said cage and extending toward said valve, a boss carried by said valve of less diameter than the inner diameter of said annular ring and extending toward said annular ring, said boss having a recess formed therein and a projection formed within the space defined by said annular ring of smaller diameter than said recess whereby when said valve moves toward said cage, said boss will enter the space defined by said annular ring and said projection will enter said recess formed in said boss whereby liquid confined between said valve and said cage will act as a damper against rapid movement of said valve.

2. A valve assembly comprising a body having large and small openings in opposite ends thereof, the larger opening being the inlet opening and the smaller opening being the outlet opening, said openings being surrounded by exteriorly threaded flanges of different diameters and the outer termination of the small flange being formed into a valve seat, a valve retaining cage screw threadedly connected to the flange surrounding the smaller opening and having its top wall disposed in spaced parallel relation to said valve seat, a valve disposed within said cage adapted to normally rest upon said valve seat and close the opening therethrough, the central portion of the lower face of said valve being inverted cone-shaped whereby water flowing through the said smaller opening is diverted out through the opening between the valve and valve seat, a cup-shaped recess in the upper face of said valve concentric therewith adapted for the reception of fluid, and a downwardly opening cup-shaped recess in the top wall of said cage concentric with, but of smaller diameter than the cup in the valve.

3. A valve consisting of, a valve seat ring, a single piece solid valve positioned thereon, a single piece cage screwed around the exterior of said ring and surrounding said valve and forming a guide therefor said cage carrying an annular ring extending toward said valve, a boss centrally positioned on said valve and extending toward said ring and having an annular channel therearound, said boss being adapted to enter said ring and said annular ring to enter said channel when said valve is unseated, said boss being outside of said annular ring when said valve is seated, whereby liquid confined between said valve and said cage and between said boss and the interior of said annular ring will act as a damper against rapid movement of said valve while unseating.

LEE L. CARSON.